Inventors
Harold Hillier
Frank Bruce King
by
Pennie, Edmonds, Morton, Barrows & Taylor
Attorneys United States Patent Office 2,733,196
Patented Jan. 31, 1956

2,733,196
TREATMENT OF SEA WATER FOR EVAPORATING PLANTS

Harold Hillier and Frank Bruce Ling, Glasgow, Scotland, assignors to G. & J. Weir Limited, Glasgow, Scotland, a company of the United Kingdom of Great Britain and Northern Ireland Application December 5, 1951, Serial No. 260,054

Claims priority, application Great Britain May 7, 1951

8 Claims. (Cl. 202—57)

This invention relates to evaporating and distilling plants in which sea water or other hard water is evaporated for the purpose of removing undesirable solids which are present in the water, the vapour so produced being subsequently condensed, the condensate being suitable for consumption as drinking water or for use in high pressure steam boilers.

For the purpose of the following description it will be assumed that the water treated is sea water.

In the operation of an evaporator, it is usual to supply heating steam from any convenient source to a heating surface in the evaporator, a portion of the heat in such heating steam being transferred across the metal membrane of the heating surface to the liquid which is being evaporated.

The evaporation of some of the sea water leaves behind in the evaporator shell solids dissolved in the sea water so that the concentration or density of the brine in the evaporator shell is increased considerably to exceed that of normal sea water. In order to prevent too great a concentration of solids, it is common practice to bleed from the evaporator a quantity of brine to maintain the brine in the evaporator at a predetermined density or within a predetermined range of density.

In the operation of the evaporator, the sea water is, therefore, subjected to heating and concentration of the contained solids and these actions result in the precipitation of some of the solids and the formation of scale on the heating surface of the evaporator. Serious difficulties are experienced in the operation of sea water distilling plants owing to the formation of scale on the heating surface through which heat is transmitted from the heating steam to the liquid which is being evaporated. The solid constituents which are precipitated on the heating surface become bonded to the metal of the heating surface and, in many cases, form an extremely hard scale which offers a serious resistance to the transfer of heat from the heating medium to the liquid, thereby reducing materially the output which can be obtained from a given plant and entailing considerable costs and inconvenience in the withdrawal of the plant from operation to permit the necessary cleaning operations for the removal of the scale so formed on the heating surface.

With sea water, the formation of scale is very rapid with the result that the interruptions in service for cleaning are frequent and serious.

To offset the resistance offered by the scale formation, which has hitherto been unavoidable in the operation of such plants, it has been necessary to provide heating surfaces which are considerably larger than required for the necessary heat transfer when the heating surfaces are clean, thus resulting in the provision of plants which are considerably larger, heavier and more expensive than would otherwise have been necessary for a given duty.

Increase of the heating surface is particularly disadvantageous when the plant is installed in a naval vessel where space available is limited and the reduction of weight of plant is of paramount importance.

Analysis shows that with the usual operating conditions the scale which is formed comprises a calcium carbonate scale known as calcite, a magnesium hydroxide scale known as brucite and calcium sulphate scales which may be anhydrite, gypsum or hemi-hydrate. Mixtures of these scales may be met with depending on the operating conditions.

It is possible to prevent the formation of calcium sulphate scales by extracting brine from the evaporator at such a rate as to ensure that the brine density shall not exceed a particular density for any given set of operating conditions, but the method practised does not prevent the formation of calcium carbonate scale and magnesium hydroxide scale.

The composition of sea water does not vary greatly throughout the world and such variations as exist are not significant to the invention which can be used in connection with estuary or harbour waters which are in contact with sea water.

The calcium bicarbonate in sea water is present as calcium ions and bicarbonate ions, and, in the course of our research, we have found that, as the sea water is heated, a progressively increasing proportion of the bicarbonate ions becomes broken into carbonate ions, water and carbon dioxide gas, the carbon dioxide gas being released from the water. This action continues until all the bicarbonate ions are disintegrated. As a result of this action, some of the carbonate ions and some of the calcium ions combine and form a scale which grows rapidly on the heating surfaces. There also occurs further action in which some of the carbonate ions break up in a manner which results in an increase of the hydroxyl ions concentration, and, as the concentration of the hydroxyl ions is increased, some of these ions combine with the magnesium ions in the water to form magnesium hydroxide which forms a hard scale on the heating surfaces of the evaporator.

It is known that the introduction of certain acids such as hydrochloric acid or sulphuric acid will prevent the formation of calcium carbonate and its corresponding scales but the use of such acids involves a serious attack on the metals of which the evaporator is constructed and has other dangerous aspects. The transport of such acids requires the use of containers of fragile material resistant to corrosive attack and any highly active acid presents a definite risk of personal damage to any party who makes contact with the acid. The several disadvantages associated with the use of such acids are so marked that the continuous use of acids in the operation of evaporating plants is not considered an acceptable practice; the use of such acids is therefore generally confined to the cleaning of evaporators when the evaporators are out of operation.

The problem involved has been the subject of considerable research and experiment and numerous forms of chemical additives have been tried with the object of preventing scale formation, but none of them has appreciably affected the rate of scale formation, although in some cases, the additives have the effect of reducing the mechanical strength of the scale which is formed. In many cases, the scale is replaced by a sludge which adheres tenaciously to the heating surfaces and is often more objectionable than the comparatively hard scale which the sludge replaces.

It is also known to subject the sea water to external treatment with the addition of chemicals and to cause the sea water to pass through contact treatment vessels with the object of reducing or eliminating scale formation.

The present invention utilises a chemical compound which can be safely and easily transported and which, on injection into an evaporator which is used for evaporating sea water, will prevent the formation of scale or sludge on the heating surface of the evaporator.

The invention comprises the injection into the water fed to the evaporator or into the brine in the evaporator, of an iron salt, an aluminium salt or a zinc salt or an aqueous solution of such salt. Such salts, when added to water, dissociate, so that their respective metallic ions and non-metallic ions move about within the sea water or within the concentrated sea water and in so doing are free to combine with other elements which are present in the water. For the purpose of the invention there may be used a combination of such salts or dispersing agents, with or without inhibitors or other additives.

It has been found that there is a marked preference for the metallic ions of the salts mentioned to combine with hydroxyl ions present in the sea water and to form a metallic hydroxide which is precipitated in the concentrated sea water and that such precipitate does not adhere or cling to the heating surfaces or other surfaces in the evaporator but can be removed with the brine evacuated from the evaporator.

The metallic salt which is preferably used for this purpose is ferric chloride which in aqueous solution dissociates into ferric ions and chlorine ions, the chlorine ions being extremely soluble in the concentrated sea water. The ferric ions on entering the evaporator make contact with and combine with hydroxyl ions to form ferric hydroxide which is precipitated but remains substantially in suspension and can be evacuated with the brine leaving the evaporator.

When the ferric ions combine with hydroxyl ions, the relative concentration of the hydrogen ions present in the water is increased, resulting in a disintegration of some of the carbonate ions, and, so long as ferric ions are introduced, the action will continue to the elimination of all the carbonate ions, thereby preventing any calcium carbonate scale formation.

If magnesium hydroxide scale is likely to form, the introduction of ferric ions results in the ferric ions marrying the hydroxyl ions which would otherwise have married with magnesium ions to form a magnesium hydroxide scale, and, so long as ferric ions are supplied to the evaporator, the action will continue until all the hydroxyl ions which would otherwise have combined with the magnesium ions to form magnesium hydroxide are married instead to ferric ions to form ferric hydroxide and the formation of magnesium hydroxide scale is prevented.

It has been found that ferric hydroxide thus precipitated does not attach itself in any way to the heating surfaces of the evaporator, so that the evaporator heating surfaces are left in a clean condition irrespective of the length of time during which the evaporator is in operation.

The heat transfer coefficient for the transfer of heat from the heating steam across the metal membrane of the heating surface to the liquid is, therefore, maintained substantially constant, the output of the evaporator is maintained constant, and the previously experienced inconvenience and reduction in output and the necessity for cleaning and withdrawal of plant for cleaning and maintenance are eliminated. It is possible to provide a much smaller heating surface and a much smaller evaporator for a given duty, besides eliminating the cost, inconvenience and disadvantages necessitated by the cleaning operations which must be effected at fairly frequent intervals when scale forms.

There may be used other metallic elements such as aluminium or zinc and they may be combined with non-metallic elements as chlorides or sulphates. The choice of the salt to be used will, to a large extent, be dictated by the cost of the salt to be used for a given duty, its availability and its convenience in handling.

It has been found that with the addition of a metallic salt such as ferric chloride and the other salts mentioned, a sea water evaporator can be run continuously over long periods of time without any falling off in output and without any formation of scale. The amount of salt to be added is comparatively small.

The metallic salt may be dissolved in a container of water external to the evaporator and piped to the evaporator shell, or, where a vacuum exists in the evaporator, the salt or solution may be forced into the evaporator by the pressure difference existing between the atmosphere and the pressure in the evaporator shell.

The metallic salt may be injected into the sea water in any convenient way before it enters the evaporator shell. Since the evaporator output will be maintained constant, no difficulty is experienced in arranging for the required proportion of metallic salt to be fed continuously into the evaporator.

While the invention has been described as particularly suitable for use in evaporating sea water, it may be used in evaporating any natural water from which calcium carbonate and/or magnesium hydroxide scales are ordinarily precipitated.

While there has been described the injection of the chemical additive direct into the evaporator shell, the chemical additive may be injected into the evaporator feed line upstream of any heat exchanger which may be provided for heating the feed water with the object of preventing scale formation in such heat exchanger.

In order that the invention may be clearly understood, it will now be described with reference to the accompanying drawings.

Figure 1:
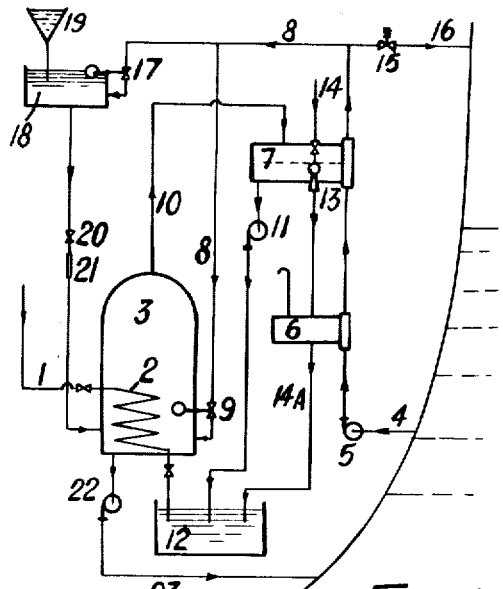
Fig. 1 shows a single effect evaporating plant with an arrangement whereby the chemical compound enters the evaporator shell by gravity.

Referring to Fig. 1, heating steam is supplied through a pipe 1 to a heating surface 2 within an evaporator shell 3. Feed water is drawn from the sea through a pipe 4 by a pump 5 which discharges through an air ejector condenser 6 and a distilling condenser 7 by way of a pipe 8 and feed regulator 9 to the evaporator shell 3. The vapour resulting from the heat transfer across the heating surface 2 is led by way of a pipe 10 to the distilling condenser 7, wherein it is condensed, the resulting condensate being removed by a pump 11 which discharges into a distilled water tank 12.

The evaporator shell 3 is operated under vacuum which is maintained by an ejector 13 which is supplied with operating steam by way of a pipe 14, the discharge from the ejector 13 being condensed in the ejector condenser 6; the resultant drainage drains by the way of a pipe 14A to the water tank 12. A portion of the sea water discharged by the pump 5 through the air ejector condenser 6 and the distilling condenser 7 is discharged overboard by way of a spring loaded valve 15 through the pipe 16.

Some of the water discharged by the pump 5 is led through a float controlled valve 17 to a small tank 18. The selected chemical compound is added by way of a funnel 19 into the water in the tank 18. The water to which the chemical compound has been added is led by gravity into the evaporator shell 3 under the control of a regulating valve 20. The pipeline is preferably provided with a sight glass 21 to permit the rate of flow to be observed. It will be understood that the proper weight of the chemical compound, which is preferably ferric chloride, is intimately mixed in the water in the tank 18 before it is injected into the evaporator shell 3, the amount of water and chemical compound so fed being proportional to the supply of sea water to the evaporator shell. Brine is withdrawn continuously from the evaporator shell 3 by a pump 22 which discharges the brine overboard through a pipe 23.

The injection of ferric chloride into the evaporator may be so arranged as to neutralise the hydroxl ions which are formed as the result of the disintegration of the bicarbonate and carbonate ions at the temperature conditions prevailing in the evaporator shell 3.

Figure 2:
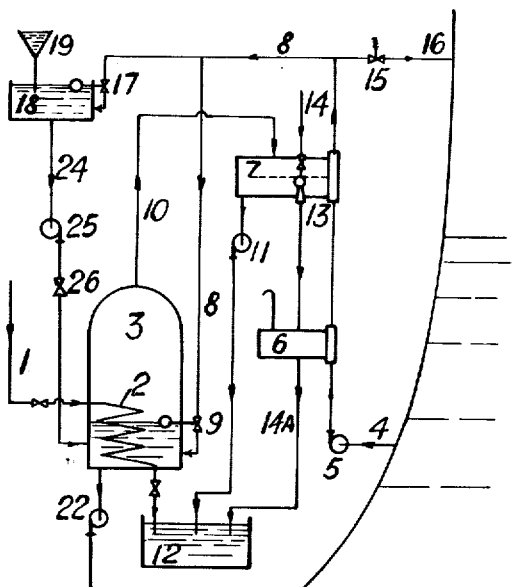
Fig. 2 shows a single effect plant with provision whereby the chemical compound is injected into the evaporator shell by means of a pump.

Referring to Fig. 2, the same reference numerals are used to denote similar parts.

The evaporating plant is generally the same as described in relation to Fig. 1, but the evaporator may be operated at a low vacuum or even under pressure, or the tank 18 may be in such a position that it is impossible to obtain a gravity flow of the chemical compound into the evaporator shell 3. In such a plant, therefore, the water in the tank 18 to which the chemical compound has been added through the funnel 19 is withdrawn from the tank through a pipe 24 by a pump 25, which discharges into the shell of the evaporator 3. The amount of chemical compound injected is controlled by manual adjustment of a valve 26 so that the mixture of sea water and chemical compound discharged into the shell is in an amount proportional to the amount of sea water supplied to the evaporator shell.

Figure 3:
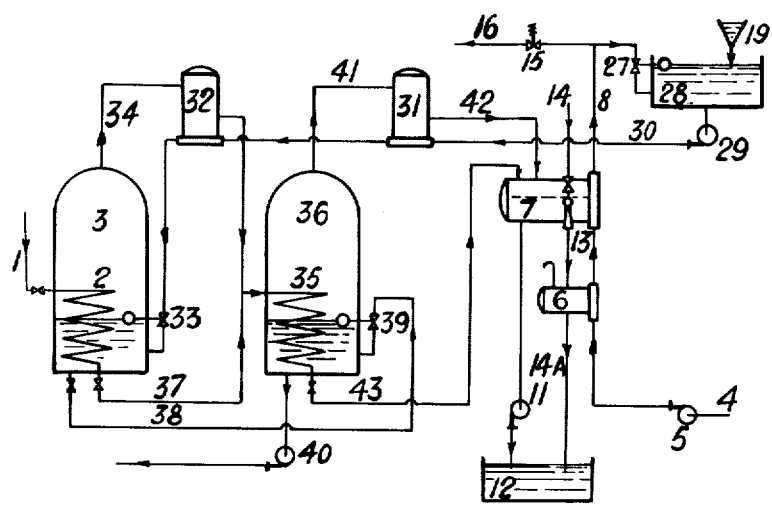
Fig. 3 shows a double effect evaporating plant with preheaters, with an arrangement whereby the chemical compound is added to the feed water in an open tank from which the feed water is subsequently pumped through the feed heaters into the first effect evaporator shell.

Referring to Fig. 3, heating steam is supplied to the first effect evaporator by way of the pipe 1 to the heating surface 2 of the first effect shell 3. Sea water is drawn by the pump 5 through the pipe 4 and discharged through the air ejector condenser 6 and distilling condenser 7 to the discharge pipeline 8. Some of the water passes overboard by way of the spring-loaded valve 15, while the remainder of the water passes by way of a regulating valve 27 into a tank 28. The tank 28 receives all of the sea water which is being fed into the evaporator shell 3. The chemical compound is added by way of the funnel 19 to the sea water in the tank 28, whence it is withdrawn by a pump 29 and discharged through a pipe 30 and preheaters 31 and 32 and a feed regulator 33 into the first evaporator shell 3.

Vapour formed by the transfer of heat across the heating surface 2 leaves the evaporator 3 by way of a vapour outlet pipe 34 and passes into the shell of the preheater 32, in which a small amount of said vapour is condensed by the feed water passing through the preheater 32, the resultant drainage and any uncondensed vapour passing to the heating surface 35 of the second effect shell 36. Drainage resulting from the condensation of the heating steam in the heating surface 2 passes by way of a pipe 37 to the heating surface 35 of the evaporator 36. Brine from the evaporator 3 passes by way of a pipe 38 and feed regulator 39 into the shell of the second effect evaporator 36. Brine from the evaporator 36 is withdrawn by a pump 40 which discharges the brine to waste or overboard.

Vapour resulting from the transfer of heat across the heating surface 35 leaves the evaporator 36 by way of a pipe 41 and passes into the preheater 31 through which the feed to the evaporating plant is passing, a certain amount of vapour being condensed in heating the feed water. The non-condensed vapour and the drainage which is formed leaves the preheater 31 by way of a pipe 42 and enters the distilling condenser 7. Drainage from the heating surface 35 is led by way of a pipe 43 to the distilling condenser. Air and other non-condensable gases are withdrawn from the distilling condenser by the air ejector 13, the discharge from which is condensed in the ejector condenser 6 and the resultant condensate passes by way of the pipe 14A to the tank 12. The condensate resulting in the distilling condenser 7 is withdrawn by the pump 11 and discharged into the tank 12.

The chemical compound added by way of the funnel 19 into the evaporator feed water passing through the tank 28 is of an amount proportional to the total amount of sea water fed into the first effect evaporator.

If preferred the evaporators 3 and 36 may be fed in parallel instead of in series as shown and the brine may be withdrawn in parallel instead of in series as shown.

Brine is withdrawn continuously from the plant by the methods described in the amount necessary to prevent the concentration from exceeding that required to prevent the formation of calcium sulphate scale. The injection of ferric chloride into the evaporating plant may be so contrived as to neutralise the hydroxyl ions which are formed as the result of the disintegration of the bicarbonate and carbonate ions at the temperature conditions prevailing in each evaporator shell.

Evaporating plants may be of the single or multiple effect type comprising more effects than described in relation to Fig. 3. They may be operated under pressure or under vacuum, or some shells may be under pressure and some shells under vacuum. The invention is equally applicable to all such plants.

What is claimed is:

1. In the evaporation of sea water normally containing calcium and magnesium for the production of distilled water, in which the sea water is heated by heating surfaces in an evaporator, the steps of supplying sea water to the evaporator, discharging brine from the evaporator, preventing the deposition of calcium carbonate scale and magnesium hydroxide scale on the heating surfaces of the evaporator during the evaporation of the sea water in the evaporator by introducing into the evaporator a sea water soluble salt of at least one of the metals selected from the group consisting of iron, aluminum and zinc, the metal ion of said salt having the property of combining with hydroxyl ions present in the sea water to form an insoluble hydroxide in the sea water in the evaporator and the function of preventing scale formation in the evaporator from the calcium and magnesium content of the sea water in the evaporator, effecting the evaporation of the sea water in the presence of said salt and the hydroxide formed therefrom, and discharging the hydroxide of the metal of said salt along with the calcium and magnesium content of the sea water in the brine discharged from the evaporator.

2. The evaporation of sea water as claimed in claim 1 in which the sea water soluble salt is a ferric salt.

3. The evaporation of sea water as claimed in claim 1, in which the sea water soluble salt is ferric chloride.

4. The evaporation of sea water as claimed in claim 1, in which the salt is added to and mixed with the sea water supplied to the evaporator at a point in advance of its entry into the evaporator and is then introduced into the evaporator along with the sea water to be subjected to vaporization.

5. In the evaporation of sea water normally containing calcium and magnesium for the production of distilled water, in which the sea water is heated by heating surfaces in an evaporator, the steps of supplying sea water to the evaporator, discharging brine from the evaporator, preventing the deposition of calcium carbonate scale and magnesium hydroxide scale on the heating surfaces of the evaporator during the evaporation of the sea water in the evaporator by introducing into the evaporator at least one of the salts selected from the group consisting of iron chloride, iron sulphate, aluminum chloride, aluminum sulphate, zinc chloride, and zinc sulphate, the metal ion of said salt having the property of combining with hydroxyl ions in the sea water in the evaporator and the function of preventing scale formation on the heating surfaces in the evaporator, effecting the evaporation of the sea water in the presence of said salt and the hydroxide formed therefrom, and discharging the hydroxide of the metal of said salt along with the calcium and magnesium content of the sea water in the brine discharged from the evaporator.

6. In the evaporation of sea water for the production of distilled water, in which the sea water is heated by heating surfaces in an evaporator, the process comprising supplying sea water to the evaporator, discharging brine from the evaporator, preventing the deposition of calcium carbonate scale and magnesium hydroxide scale on the heating surfaces of the evaporator during the evaporation of the sea water in the evaporator by introducing into the evaporator a sea water soluble salt of at least one of the metals selected from the group consisting of iron, aluminum and zinc, the metal ion of said salt having the property of forming an insoluble hydroxide with the hydroxyl ions in the sea water in the evaporator thereby causing a decrease in the concentration of hydroxyl ions in the sea water in the evaporator and thereby permitting the decomposition of carbonate ions to proceed, whereby the calcium and magnesium content of the sea water in the evaporator is maintained in the sea water and removed from the evaporator with the brine without causing the deposition of scale on the heating surfaces in the evaporator, effecting the evaporation of the sea water in the presence of said salt and the hydroxide formed therefrom, and discharging the hydroxide of the metal of said salt along with the calcium and magnesium content of the sea water in the brine discharged from the evaporator.

7. The evaporation of sea water as claimed in claim 6, in which said sea water soluble salt is a salt selected from the group consisting of iron chloride, iron sulphate, aluminum chloride, aluminum sulphate, zinc chloride, and zinc sulphate.

8. The evaporation of sea water as claimed in claim 6, in which said sea water soluble salt is ferric chloride.

References Cited in the file of this patent

UNITED STATES PATENTS

| Number | Name | Date |
|---|---|---|
| 1,757,526 | Hedgepeth | May 6, 1930 |
| 1,918,555 | Partridge | July 18, 1933 |
| 1,927,027 | Foulds | Sept. 19, 1933 |
| 2,359,281 | Andrus | Oct. 3, 1944 |
| 2,360,730 | Smith | Oct. 17, 1944 |
| 2,373,884 | Frisch | Apr. 17, 1945 |

Disclaimer 2,733,196.—*Harold Hillier* and *Frank Bruce Ling*, Glasgow, Scotland. TREATMENT OF SEA WATER FOR EVAPORATING PLANTS. Patent dated Jan. 31, 1956. Disclaimer filed Sept. 27, 1956, by the assignees, *G. & J. Weir, Limited*.

Hereby enter this disclaimer to claims 1 to 8, inclusive, of said patent.
[*Official Gazette November 6, 1956.*]